J. GALL.
Thermometer.

No. 167,327.  Patented Aug. 31, 1875.

WITNESSES

INVENTOR

UNITED STATES PATENT OFFICE.

JOSEPH GALL, OF NEW YORK, N. Y.

IMPROVEMENT IN THERMOMETERS.

Specification forming part of Letters Patent No. 167,327, dated August 31, 1875; application filed February 5, 1875.

*To all whom it may concern:*

Be it known that I, JOSEPH GALL, of the city, county, and State of New York, have invented a new and useful Improvement in Thermometer-Cases; and that the following is a full, clear, and exact description of the same, reference being had to the accompanying drawings, and to the letters of reference marked thereon, making a part of this specification.

This invention is in the nature of an improvement in thermometer-cases; and the invention consists in a thermometer-case closed at its upper end, transparent, and provided with a series of ventilating-apertures, placed near the upper and lower ends of the case, and the closed upper end of the case being constructed to support and steady the inclosed thermometer.

Figure 1:
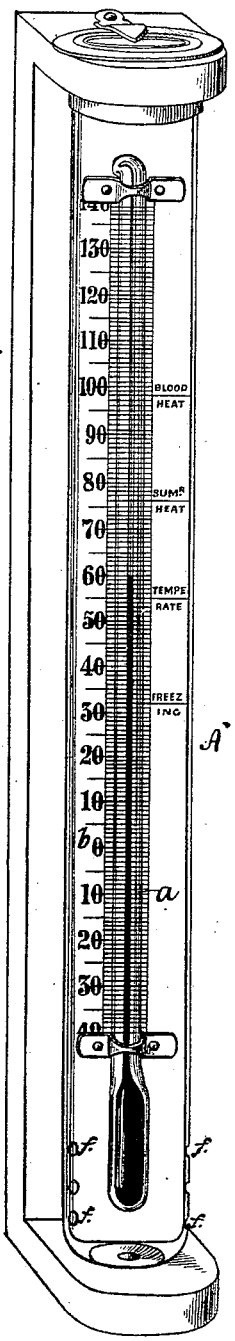
Figure 2:
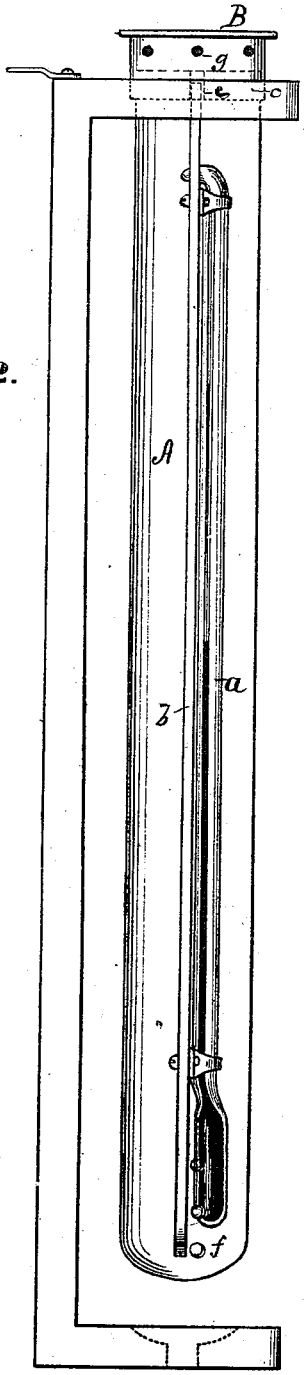

In the accompanying sheet of drawings, Figures 1 and 2 are representations of my invention.

Similar letters of reference indicate like parts in both figures.

As is well known, it is desirable to protect thermometers designed for outside purposes from the weather. To do this, and at the same time admit of reading the scale with facility, it is customary to combine thermometers with a transparent case, so that the thermometer-tube and scale will be within the case; but it has been found necessary in such cases to have the bulb project below the case, in order to preserve the sensitiveness of the instrument. The bulb thus exposed was liable to fracture from accident, and if inclosed within the casing with the tube and scale it would not be sufficiently sensitive to correctly indicate the changes in temperature. To obviate this difficulty, I construct the thermometer-case A of glass. The lower end of this case is closed, or nearly closed, and within it is placed a thermometer, $a$, and scale $b$ attached thereto, the entire thermometer, consisting of tube, bulb, and scale, being wholly within the case A. The upper end of this case is closed by a cap, B, of any suitable material. Fitted within the cap B is a disk, $c$, which may also be made from any suitable material. This disk is constructed with a slot, $e$, therein, and into this slot is fitted the upper end of the thermometer-scale $b$, so that when the thermometer is placed within the case A it is held firmly in position, and prevented from moving within the case, and endangering its fracture thereby. The entire thermometer, being thus wholly inclosed within the case A, is protected from the weather, and since this case is made from comparatively strong glass, the thermometer is likewise protected from fracture from ordinary accidents. Now, the thermometer being in this way wholly inclosed within the case, it is obvious that it would not be as sensitive to atmospheric changes as it would if it were not so inclosed, for the temperature within the case A might be of a different degree from that of the surrounding atmosphere. To obviate this, and make the temperature within the case necessarily the same as without it, I form in the case A, near its lower end, or, if you please, at its lower end, a series of perforations, $f$, and also in the case, and near its upper end, a series of perforations, $g$, so that a complete circulation of air takes place within the case A from one of its ends to the other, in this way maintaining within the case, as is obvious, exactly the same degree of temperature as is found in the surrounding atmosphere.

It is essential that the apertures should be made at or near each end of the inclosing-case; otherwise there would not be a circulation of air through the tube, and the temperature within the tube would constantly vary from that outside of it; and if the apertures were made only in the inclosing-case near its lower end the surrounding air would not necessarily enter therein, since the air in the upper part of the tube would have no means of escape to make room for the admission of the outside air; but when the apertures are made at or near each end of the case the air will pass out at one end and enter at the other, if even the very slightest variation of temperature exist between the air in the interior of the case and the air surrounding it, and this will continue until a perfect equilibrium exists between the outside air and that within the case.

I am well aware that thermometers have been incased in glass and other materials; but such casings have not been provided with means for securing a continuous circulation of air through them. I am also aware that the bulbs of thermometers have been surrounded by a slotted or perforated metal guard to protect them from injury. Hence I disclaim all these features, for they form no part of my invention.

Having thus described my invention, what I claim as new, and desire to secure by Letters Patent, is—

1. As a new article of manufacture, a transparent thermometer-case, perforated at its upper and lower ends, and closed at its upper end by a cap, within which is fitted a device wherein is received the upper end of an inclosed thermometer-scale, said scale being steadied and held in position thereby, substantially as described.

2. The combination of a transparent thermometer-case, perforated at its two ends, with a thermometer and scale, substantially as and for the purpose described.

J. GALL.

In presence of—
S. D. LAW,
A. T. GURLITZ.